United States Patent [19]
Bailey

[11] Patent Number: 6,095,430
[45] Date of Patent: Aug. 1, 2000

[54] ANIMAL SPRAY SYSTEM

[76] Inventor: Charles Bailey, 10692 NW. 8th Ave., Okeechobee, Fla. 34972

[21] Appl. No.: 09/200,593

[22] Filed: Nov. 27, 1998

Related U.S. Application Data

[60] Provisional application No. 60/087,729, Jun. 2, 1998.

[51] Int. Cl.[7] .......................... A01G 25/06; B05B 15/06
[52] U.S. Cl. ..................... 239/201; 239/288.5; 119/670
[58] Field of Search .................... 119/670, 665, 119/604; 239/200, 201, 204, 206, 275, 279, 584, 288.3, 288.5

[56] References Cited

U.S. PATENT DOCUMENTS

| | | | |
|---|---|---|---|
| 1,083,024 | 12/1913 | Morris | 138/92 |
| 1,224,135 | 5/1917 | Burmeister | 138/92 |
| 1,492,941 | 5/1924 | Sherman et al. | 239/201 |
| 1,741,557 | 12/1929 | Coles | 239/201 |
| 1,776,455 | 9/1930 | Thompson | 239/201 |
| 1,931,761 | 10/1933 | Hertel | 239/201 |
| 1,970,126 | 8/1934 | Buckner | 239/201 |
| 2,611,644 | 9/1952 | Burdick | 239/201 |
| 2,793,910 | 5/1957 | Wiebe | 239/201 |
| 2,943,798 | 7/1960 | Rienks | 239/201 |
| 2,955,764 | 10/1960 | Hruby, Jr. | 239/201 |
| 3,221,708 | 12/1965 | Marley | 119/159 |
| 5,050,800 | 9/1991 | Lamar | 239/201 |
| 5,174,500 | 12/1992 | Yianilos | 239/201 |
| 5,415,130 | 5/1995 | Brackett | 119/159 |
| 5,617,999 | 4/1997 | Chiang | 239/268 |

Primary Examiner—Andres Kashnikow
Assistant Examiner—Jorge Bocanegra
Attorney, Agent, or Firm—Kevin Redmond

[57] ABSTRACT

A spray system designed for use with animals and in particular a system designed to wash the udders of cows while avoiding injuries to the cows usually encountered with such systems. The present spray system includes a low profile spray head which contains an upwardly directed recessed channel within which are placed a plurality of spray holes to direct water or other fluid spray materials at the udders. The position of the spray holes within the recess causes the fluid emitted from the spray holes to form an upwardly directed fine particle spray or mist which rises from the spray head up to three feet above the spray head, enabling the spray head to completely bathe the utters even though the spray head may be placed at floor level. The position of the spray head near floor level and the spray head's ability to providing an effective wash at high level above floor level enable the cows to be washed quickly and safely as the cows merely walk over the spray head,

6 Claims, 3 Drawing Sheets

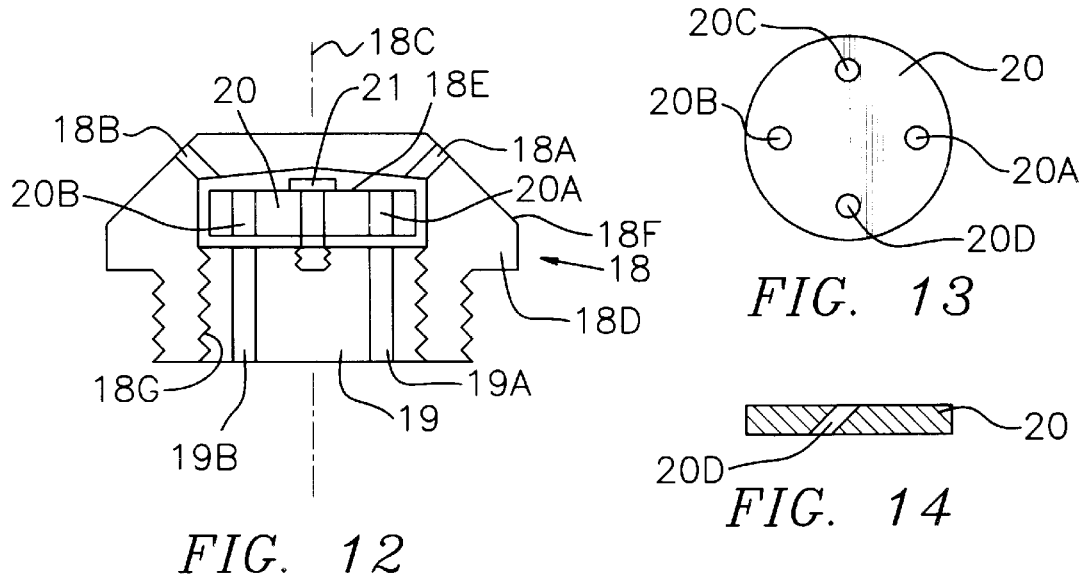
FIG. 12
FIG. 13
FIG. 14
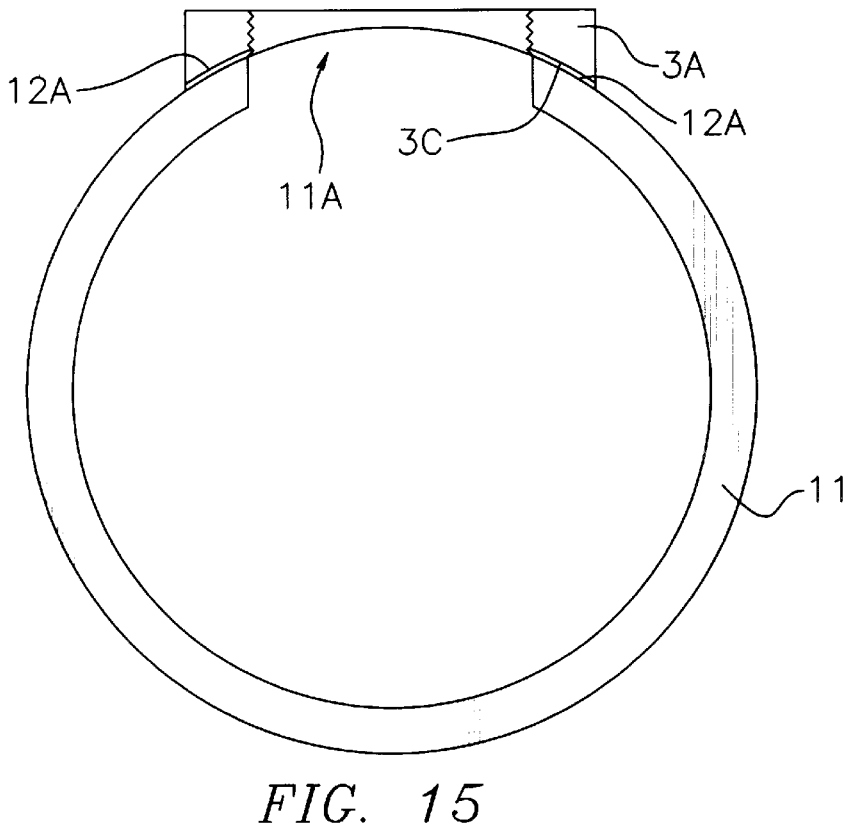
FIG. 15

ANIMAL SPRAY SYSTEM

This application claims benefit to U.S. provisional application No. 60/087,729 filed Jun. 2, 1998.

BACKGROUND

1. Field

The present invention relates to animal spray systems and more particularly to such systems designed to wash the udders of cows prior to milking.

2. Prior Art

Figure 9:
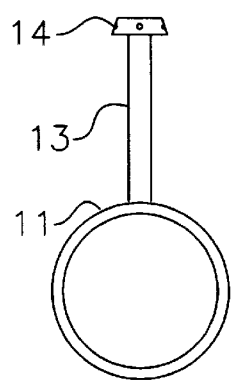

In prior art systems, the udders of milk cows are typically washed with water prior to milking by means of an elevated spray head. In such systems, the spray head, such as spray head 14 shown in FIG. 9, is raised 8 to 10 inches above floor level by mounted the spray head on top of a vertically positioned pipe, such as pipe 13, also shown this Figure. The spray head is positioned close to the udders by means of the vertical pipe to prevent the spray emanating from the head from missing the udders. Water is supplied to the vertical pipe and the spray head from a water main 11 located below the vertical pipe.

The spray produced by prior art spray head is primarily in the form of a plurality of distinct small streams each emanating from a separate hole in the spray head. The individual streams spread apart from one another as they travel away from the spray head. To insure the spread between streams is small and covers most of the average udders when the streams reach the udders, they are brought close to the utters by raising them above floor level. If the prior art spray heads were positioned instead close to the floor level with their divergent streams aimed at the average udder, then the probability is increased that some of the individual streams could miss a part or all of the udders because of the distance to the udders, the difference in individual udders and the varying position of the cows with respect to the spray head as the cows pass over the spray head.

Figure 11A:
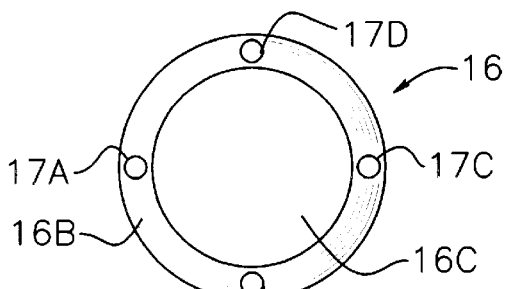
Figure 11B:
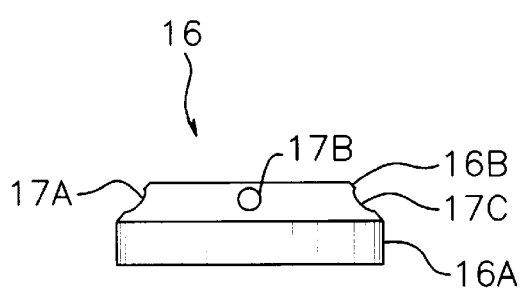

A prior art spray head 16 is shown in plan view in FIG. 11A and in elevation in FIG. 11B. The spray head 16 includes a vertical side 16A and a chamfered side 16B. There are four hole 17A through 17D located on the chamfered side. Each hole produces an individual stream which is directed upwards and to the side of the head, creating the divergence between the streams as they travel further from the head.

An alternate to placing the holes on the chamfered side is to place them on the top surface 16C of the spray head, but to angle the holes away from the center of the head to provide some distance between the individual streams to prevent all the streams from spraying the water at a single location. The results are similar to placing the holes on the chamfered surface. The individual streams spread apart as the travel away from the head and can contribute to a stream missing all or part of the udders.

Regardless of how these streams are aimed, it is difficult to provide a spray head of this type located near floor level which covers the udders well because the udders of different cows are at different heights. Coverage of the udders with individual streams is in part achieved by the spattering of the streams once they hits the utters; however, spattering is not a completely satisfactory method of washing because it uses partly contaminated water to wash the parts of the udders not hit directly by a stream. To effect the spattering, the streams must remain at a relatively high pressure level when they hits the udders. To insure that this relative high pressure is achieved, the spray heads are positioned close to the utters.

This is a second reason for the raised height of the prior art spray heads and it is precisely this height that presents one of the greatest problem encountered with this prior art system. The vertical pipes are the cause of thousand of dollars of injuries occurring presently on thousand of farms throughout the country. These injuries are caused by the cows kicking and stumbling over the vertical pipes. Many of the areas in which these prior art system are installed are filled with multiple heads and with multiple vertical pipes to insure that the cows are washed thoroughly; however, the multiple vertical pipes only multiply the chances of incurring injury.

The vertical pipes and the tendency of the cows to kick the vertical pipes has prompted users of these systems to install cow guards, such as cow guard 27 which is mounted about prior art spray head 14 and vertical pipe 13 as shown in FIGS. 16A and 16B.

FIG. 16A is approximately full scale while FIG. 16B is reduced scale to permit showing the relative height of the vertical pipe 13 with respect to the cow guard 27. The cow guard is typically a section of four inch diameter pipe cut in four inch lengths and welded to the water main about the junction of the pipe 13 to prevent cows from kicking, bending and eventually breaking off the pipe 13 from the water main.

Unfortunately the cow guard causes as much injury and in many cases more serious injury than the vertical pipes do. The cows can have the hoofs cut off while walking over the cow guards because the edges of the guards become sharp as the sides of the guards are continually brushed by the cows hoofs. A cow can step on top of the sharp guard and then have another cow step on her hoof causing the severing of the hoof. This is extremely upsetting to the rancher who owns the cows because he does not want the cows to suffer in this way and also because it represents a serious financial loss.

As noted above, the financial loss to those in milk producing industry can be highs but the extent of that loss comes into clearer view when specific costs are considered. The cost of a replacement cow is typically $1,200. The loss of 2 percent per year of 1,000 head is 20 head or $24,000 per year. Replacement of heads and pipes in prior art systems, which can last as little as three months, add approximately $1,000 more in cost per year for a total of $25,000 a year.

There is currently a serious need in the milk producing industry for a new spray head which presents a low profile and entirely eliminates the vertical pipes and the cow guards to reduce the present high cost of injuries incurred with the prior art spray system. Despite the lower pressure and greater distance of lowered spray head, any system incorporating lowered spray heads to be successful must overcome these problems and be capable of thoroughly washing the entire udders.

SUMMARY

It is an object of the present invention to provide a spray head for washing cow udders which does not cause injury to the cows due to their kicking or stumbling over the spray head and its vertical support pipe.

It is an object of the present invention to provide a spray head for washing the udders of cows which does not use a vertical pipe to support the spray head above floor level or a cow guard to protect the vertical pipe.

It is an object of the present invention to provide a spray head for cleaning cows udders which covers the entire udders with a single head.

It is an object of the present invention to provide a spray head which produces a wide area fine spray at a height of up to 3 feet above the spray head.

Figure 2:
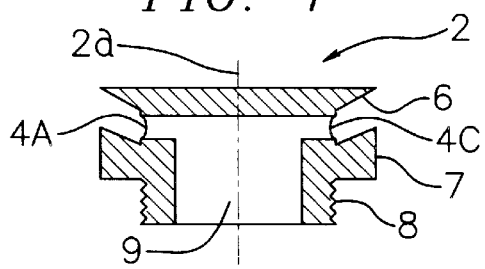
Figure 3:
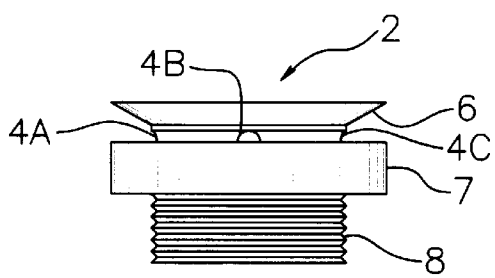
Figure 4:
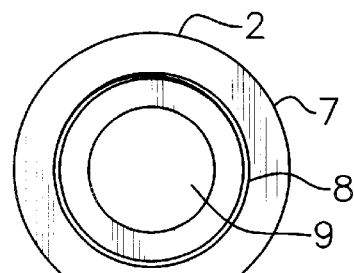
Figure 5:
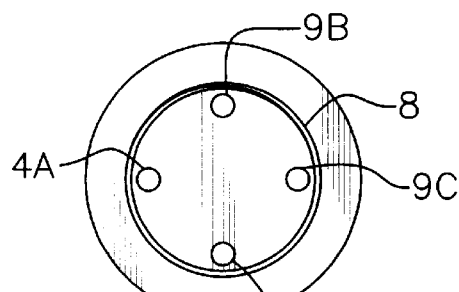
Figure 2A:
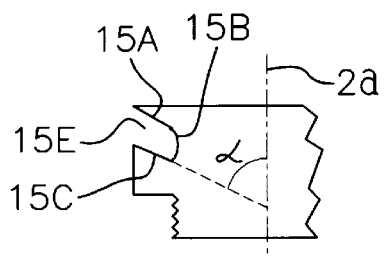

The present invention comprises a low profile spray head which contains an upwardly directed recessed channel within which are placed a plurality of spray holes to direct water or other fluid spray materials at the udders. The position of the spray holes within the recessed channel causes the fluid emitted from the spray holes to interact with the recessed channel to form an upwardly directed fine particle spray or mist which rises from the spray head up to three feet or more above the spray head and over a four square foot area at the udder level This mist enables the spray head to completely bathe the utters, even though the spray head may be placed at or near floor level. An alternative low profile spinning spray head also located close to floor level provides the same advantages, but produces the fine particle spray by means of the spinning head The ability to place the spray at or near floor level eliminates the need for a vertical pipe to support the spray head and thereby eliminates a serious cause of injury to the cows while providing a spray that completely covers the udders with clean water. Since there is no vertical pipe, there is no need for a cow guard. The need for the use of spattering as washing technique is eliminated. A field of low profile multiple heads can be employed to provide redundant washing and thereby insure a thorough washing without concern for the number of vertical pipes, because they are no longer present. The removal of the vertical pipes and the removal of the cow guards constitute the elimination of a serious threat of injury to the cows that these prior art pipes and guards represented.

BRIEF DESCRIPTION OF THE DRAWINGS

FIG. 1 is a cross sectional bottom view of an embodiment of a spray head in accordance with the present invention with the section being taken horizontally at the level of the spray holes.

FIG. 2 is a side cross sectional view of the spray head with the section being taken vertically through holes 4A and 4C.

FIG. 2A shows the left-hand portion of the spray head and illustrates the angle a recessed channel in the spray heads makes with an axis of revolution of the spray head.

FIG. 3 is a elevation view of the spray head.

FIG. 4 is a bottom view an embodiment of the spray head which contains a single large fluid channel.

FIG. 5 is a bottom view of an embodiment of the spray which contains four separate fluid passageways, one for each of the spray holes.

FIG. 6 is a side view of the spray head of FIG. 2 connected to an adapter.

FIG. 7. is a bottom view of the embodiment of the spray head shown in FIG. 2 connected to an adapter.

FIG. 8 is a side view of the spray head connected to an adapter which has been welded to a water main.

FIG. 9 is a elevation view of a prior art system in which a spray head is elevated above floor level by a vertical pipe.

FIG. 10 is a elevation view of the present invention connected directly to a water main without the use of any vertical pipes.

FIG. 11A is plan view of a prior art spray head.

FIG. 11B is an elevation view of a prior art spray head.

FIG. 12 is a side cross sectional view of a spinner spray head employed with the present invention.

FIG. 13 is a plan view of the spinner used in the spinner spray head.

FIG. 14 is a side cross sectional view of the spinner shown in FIG. 13 with the cross section taken through hole 20D.

FIG. 15 is a cross sectional view of a water line with a beveled adapter welded to the water main.

DETAILED DESCRIPTION OF THE INVENTION

A first embodiment of the spray head 2 is shown in FIGS. 1 through 4. The spray head is comprised of a hood 6, a base 7, threads 8, an internal passageway 9 and an externally located recessed channel 15. At the inside end of the recessed channel are four spray holes 4A through 4D. As can be seen in bottom view of the spray head, shown in FIG. 4, the head is typically round with the axis of revolution passing perpendicularly through the center of head as it is positioned in this Figure. This view of the spray head also shows what distinguishes the first embodiment of the spray head. It is a internal passageway 9 located centrally in the bottom of the head which is used to conduct fluid, usually water, to the spray holes which are located in the top portion of the spray head. About the outside of this fluid passageway are mounting threads 8 used to secure the head to an adapter. The spray head base 7 can be seen in this Figure to extend radially outwardly beyond the fluid passageway.

FIG. 5 is a bottom view of a second embodiment of the invention in which the fluid passageway 9 is replaced with four individual fluid passageways 9A through 9D which connect with spray holes 4A through 4D. The advantage of the second embodiment is lower machining cost and a stronger spray head because less material is removed from the center of the spray head.

FIG. 3 is a side elevation of the spray head for both the first and second embodiments which shows the head in the position it is typically used in the field. The spray head has a top a bottom and sides. The sides are usually round. The top of the head includes a hood 6 which itself has a flat top that forms the top of the spray head. The lower side of the hood tapers down and inwardly. Below the hood are four spray holes 4A through 4D of which 4A through 4C are visible in this view. These spray holes are usually disbursed at 90 degrees intervals about the periphery of the spray head. The base 7 is located below the hood at a distance equal to or greater than the diameter of the spray holes, The mounting threads 8 are located immediately below the base.

FIG. 2 is a elevation cross sectional view of the spray head with the section being taken vertically through the holes 4A and 4C. This Figure shows the top of the base to be tapered down and inwardly and generally parallel to the lower surface of the hood.

The space between the hood and the base forms a recessed channel 15. The recessed channel has an outside end 15E extending around the periphery of the spray head where the recessed channel emerges from the spray head, as shown in FIG. 2A. Opposite the outside end of the recessed channel is the inside end of the recessed channel 15B which is also known as the recessed channel side wall and which contains the spray holes, The top of the channel 15A lies above and generally parallel to the bottom of the channel 15C. The top and bottom walls of the recessed channel generally extend outward from the top and bottom respectively of the recessed channel side wall.

The spray head has an axis of revolution 2*a* passing vertically through the center of the spray head, as can be seen in FIGS. 2 and 2A. The recessed channel makes an angle alpha with respect to the axis of revolution 2a. This angle can be varied over a wide range such as 0 to 60 degrees and is set depending on the particular application and the on the angle at which it is desired direct the spray, but is typically set at approximately 45 degrees.

Although the top and bottom walls of the recessed channel are shown or described as being parallel, and generally orthogonal to the recessed channel side wall, this arrangement may be varied without departing from the spirit of the present invention. The primary purpose of the recessed channel is to have the spray from the spray holes impinge on the recessed channel walls to produce a fine particle spray and to direct this spray when it leaves the spray head. Many variations in the shape of the walls are possible without materially deviating from the concept of the recessed channel or materially affecting the performance of the recessed channel and all such variations are considered equivalent which are within the scope of the present invention. Another equivalent of the present invention has the recessed channel broken into segment about the spray holes. That is, the recessed channel exists only about each spray hole rather than running continuously about the entire head. Since most of the spray impinges on the recessed channel near the holes, the broken series of recessed channels can perform almost as well as the continuous recessed channel, but provides greater strength.

Figure 1:
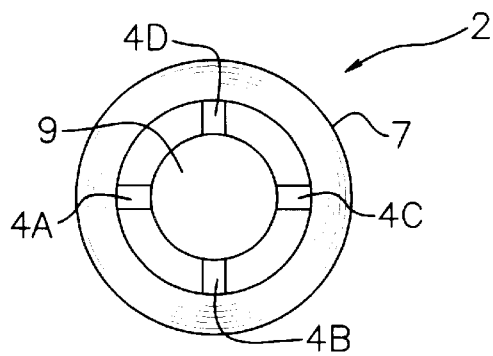

FIG. 1 shows a bottom cross sectional view of the spray head with the section being taken horizontally through all four of the spray holes. It can be seen in this Figure that fluid flowing up through passageway 9 is distributed to all four holes and then by way of the holes to the recessed channel 15.

Figure 6:
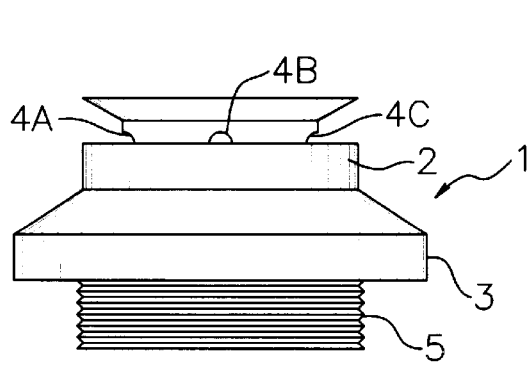

In the operation of the spray heads water under pressure is supplied to the spray head fluid passageway 9. The water flows up this channel to the spray holes where it is emitted initially as a plurality of single streams into the recessed channel. The pressure of the water and the proximity of the channel walls formed by the hood and base causes the water to impinge on the recessed channel walls and then spread out and flow along these walls before the water leaves the spray head in the form of a multiplicity of fine particle sprays. The impinging and spreading out of the stream from the spray hole produces in effect a large number of fine particle streams from the single larger stream initially emitted from the spray hole. The channel is cut into the spray head at an angle of from 30 to 90 degrees with respect to the horizontal, being usually approximately 45 degrees. threads in the center of the adapter. Note that the embodiment of the adapter 1 shown in this Figure also contains a second set of threads 5 on the external surface of its lower end for threading the adapter in to a water main. As can be seen from FIG. 6, the adapter also includes a top 1A, a bottom 1B an outwardly tapering side 1C and a base 3. Between the top and bottom is an internal passageway 10 which contains the mating threads to accept the spray head threads 8.

Figure 7:
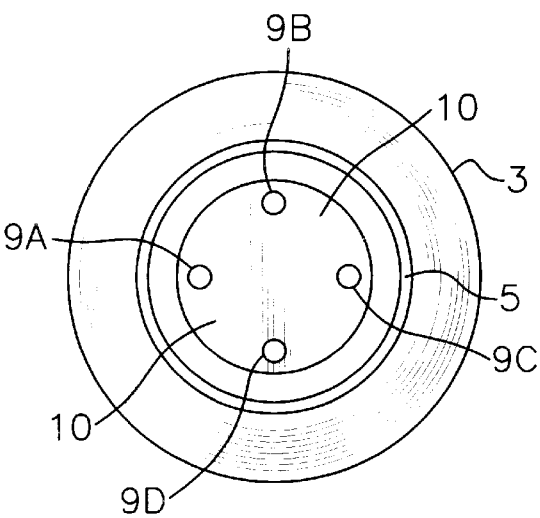

FIG. 7 shows a bottom view of the spray head when mounted in the adapter. Since the second embodiment of the spray head was chosen in this Figure, the internal channel 10 of the adapter exposes the internal passageways 9A through 9D in the spray head. These internal passageways accept water through the passageway 10 and feed it to the spray holes 4A through 4D.

Figure 8:
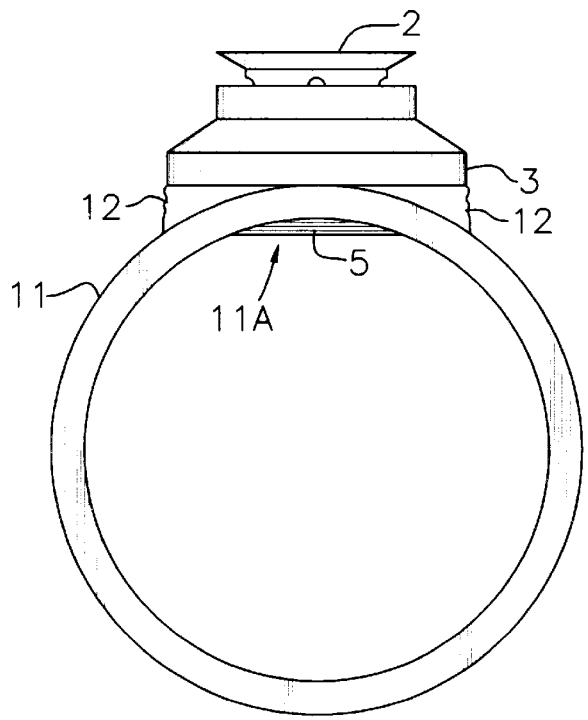

FIG. 8 shows the spray head and adapter on the water main. The water main has a top and bottom surface. The top surface of the water main is where the adapter is normally placed. The top surface of the water main is normally positioned within a few inches of and preferably at ground level. The spray head is normally less than two inches high and preferably one inch high. The adapter is normally lower in height than the spray head, making it possible for the combination of the spray head, adapter and the water main to extend above ground level between only two to three inches. This is what makes the present invention so much safer than the prior art where the heads stood 8 or more inches above the surface.

Figure 10:
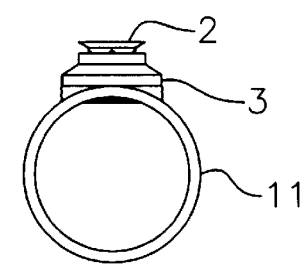

This angle results in directing the spray generally upwards towards the udders. The multiplicity of fine spray streams tend to diverge as they rise producing a spray that completely covers a wide area such a four foot square at the level of the udders, enveloping all the udders in the spray without missing any areas.

A multiplicity of fine particle sprays could be produced in a number of ways. For example, a spray head with a large number of small spray holes could be used. However, in the present application such an approach would be impractical. Cows walk over the spray heads after coming in from the field and mud or other debris falls from the cows on to the spray heads. This debris would quickly clog small spray holes. With the relative larger holes typically of one eighth to one quarter of an inch in diameter used in the present spray head, clogging rarely occurs because of the large size of the holes and because the accompanying large volume of water at high pressure coming through the spray holes tends to force the debris out of the holes. In the rare instances when clogging does occur, the few large spray holes in each head are easily cleared by running a stiff wire through them.

Water is supplied to the fluid passageway from a fluid supply main, which is usually a water main. This is accomplished by connecting the spray head to an adapter 1 which is connected to the water main, as can be seen in FIGS. 6, 7, and 8. FIG. 6 is an elevation view of a spray head 2 connected to the adapter 1. Connection of the spray head is made to the adapter by screwing the threads 8 on the lower end of the spray head into mating The adapter may be threaded into the main or welded to the main 11 over a hole 11A cut into the top of the main. Water in the main flows up the passageways 9A through 9D or up through passageway 9, depending on the embodiment chosen, to the spray holes, 4A through 4D, where it is sprayed into the recessed channel 15 and then away from the spray head as a mist which reaches and washes the udders.

The distance between the water main and the adapter is exaggerated in FIG. 8 to permit showing clearly where the weld 12 is located. The purpose of the adapter is to facilitate replacement of the heads and to make a good water tight seal to the water main. The steel typically used in a water main does not lend itself to producing a fine water tight thread. For this reason, the adapter is usually welded to the pipe. The weld insures a water tight connection to the water main. A finer thread can be cut into the adapter than is cut in the pipe so that a water tight seal is produced between the spray head and the adapter and the spray head can be easily replaced by merely unscrewing it from the adapter. Typically both the adapter and the spray head are made of stainless steel which permits long term operation without concern for corrosion.

FIG. 15 shows a second embodiment of the adapter 1A welded at 12A to the water main 11. The difference between the adapter shown in FIG. 8 and the adapter shown in FIG. 15 is the lower surface 1C of the adapter in FIG. 15 is contoured to match the curvature of the top of the main 11, thereby facilitating the welding of the adapter to the water main.

The location of the spray head in an operating system is shown for the prior art in FIG. 9 and in FIG. 10 for the present invention. These Figures are placed adjacent one another to facilitate a comparison of the two systems. It can be seen in FIG. 9 that the spray head 14 is elevated above the water main by vertical pipe 14. This raises the head 8 to 10 inches above the water main is not placed below floor level, the height can be even higher above the floor level. As noted earlier, the vertical pipes are the cause of the cows stumbling and the source of costly injuries to the cows. The present invention places the spray head directly on the pipe as can be seen in FIG. 10. It is evident that there is a substantial difference between the prior art system and the present invention. With the present invention, when the water main is dropped below the floor surface there is little for the cows to stumble on. Only the spray head is present above the floor level. However, with prior art the vertical pipes and the spray head remain elevated well above floor level and continue to present a hazard to the cow.

A third embodiment of the spray head is show in FIGS. 12, 13, and 14. This is a head which contains an internal spinner and produces a mist by means of the spinner, rather than by the use of the channel recess; however, it is possible to use the channel recess with the spinner to further insure that a fine mist will be produced by the spray head. FIG. 12 is a front elevation cross sectional view of a spinner head 18 with the cross section taken vertically through the center of the head. This spray head, which is referred to as the spinner head, is symmmetrical about a central axis of revolution 18C which passes vertically through the center of the head and the center of the spinner in this Figure.

The spinner head comprises a casing 18D, a spinner 20, a spinner bolt 21 and a spinner block 19. The casing, which is the outside shell of the head, contains a plurality of relative small spray openings about it sides on a chamfer 18F, such as openings 18A and 19B and one large opening 18G at the bottom of the casing which serves to provide access to the inside of the casing. All of the openings pass from the outside of the casino to a hollow center 18E within the casing. The spinner block, which occupies the lower inside end of the hollow within the casing and closes off the opening 18G, is threaded into position in the casing. The spinner 20 which is disc shaped is held in position over the block by the bolt 21 which passes through the center of the disc and threads into the top of the block.

The block contains a plurality of vertically passageways, such as passageways 19A and 19B, to carry water to the inside top of the spray head where the spinner is located. The spinner contains a plurality of holes such as holes 20A through 20D, as shown in FIG. 13 to pass water through the spinner to the spray head openings, such as 18A and B. The holes in the spinner are drilled an angle to the axis 18A through the spinner as seen for the hole 20 D which is shown in cross section in FIG. 14. The angle produces a lateral force on the spinner as it passes through the spinner causing it to rotate about the bolt 21 and break up the spray emitted from the spray holes to produce a fine mist spray.

The recessed channel can be used with the spinning head to insure the generation of a mist type of spray. There are other alternatives which are considered equivalents that fall within the scope of the invention Any of the means for generating torque and rotation of the head, such as hole angling described; hole off set or vanes, can he use individually or in combination to produce this result. The vanes can be located in several places such as outside the fluid passageway to catch the water as it moves towards the fluid passageway. Other variations which are also equivalents and within the scope of the invention will be obvious to those skilled in the art.

The present invention has been repeatedly and successful tested in the field tests with the spray heads positioned near floor level. No injuries were encountered; however, when the prior art system with the high positioned spray heads was reintroduced, injuries began to reappeared, providing substantiation for the efficacy of the present invention.

Having described my invention I claim:

1. A system for washing animals and in particular for washing the utters of cows prior to milking, said system including a fluid supply main carrying fluid under pressure and having an upper side and a lower side, said upper side of said fluid supply main being positioned generally parallel to and in proximity to the ground level, said system comprising at least one spray head having a top, a bottom and sides, the bottom of said spray head being connected to said upper side of said fluid supply main to permit fluid from said fluid supply main to flow into said spray head to produce an upwardly directed spray to wash the utters of the cows, the top of said spray head being generally less than 2 inches above said fluid supply main to aid in avoiding injury to the cows as they walk over the spray system in preparation to milking, said spray head includes a recessed channel about its sides and a plurality of spray holes located in said recessed channel, said spray head further including at least one internal passageway connecting said spray holes to said fluid within said fluid supply main to deliver fluid under pressure from said fluid supply main to said spray holes to emit said fluid from said spray holes out in to said recessed channel, said recessed channel being in the form of a slot having an inside end located inside the spray head and an outside end located alone the outside surface of the spray head, said recessed channel extending generally about the outside periphery of the spray head and penetrating into said head to the location of the spray holes, said recessed channel included three walls referred to as the upper, lower and side recessed channel walls, the side recessed channel wall containing said spray holes and being located at the inside end of the recessed channel, the upper recessed channel wall being connected to the upper end of the side recessed channel wall and extending generally orthogonally outward from the side recessed channel wall to the outer periphery of the spray head, and the bottom recessed channel wall being connected to the lower end of the recessed channel side wall and extending generally outward to the outer periphery of the spray head, the upper and lower recessed channel walls being generally parallel to one another and being directed upward from the horizontal as they progress from the recessed channel side wall outward at an angle ranging typically from 0 to 60 degrees to direct the spray from said spray holes upward towards the cow utters, the fluid being emitted from the spray holes producing a spray which impinging on said upper and lower recessed channel walls while traveling outward in the recessed channel to produce a fine particle mist before being emitted from the outside end of said recessed channel.

2. A system as in claim 1 wherein the side walls of the spray head are a surface of revolution about an axis drawn vertically through the center of the spray head to produce round side on said spray head to facilitate the passage of hoofs of the cows past said spray head without injury.

3. A system as claimed in claim 1, wherein said recessed channel includes a plurality of spray holes and a single internal passageway connected to and delivering fluid from the fluid supply main to all the spray holes.

4. A system as claimed in claim 1, wherein said recessed channel includes a plurality of spray holes and a plurality of individual internal passageways equal in number to the number of spray holes with each individual internal passageway connected to one spray hole and each individual internal passageway delivering fluid from the fluid supply main to the spray hole to which it is connected.

5. A system as claimed in claimed 1 further comprising a spinner in the form of a disc rotatably secured to and positioned within said spray head between said internal passageway and said spray hole, said spinner having an axis of revolution passing through the center of said spinner about which said spinner is free to rotate and said spinner containing at least one hole through said spinner away from the center of said spinner and said hole through said spinner being placed at an angle to said axis of revolution to cause said spinner to rotate as said fluid passes through said hole in said spinner from said internal channel to said spray hole.

6. A system as claimed in claim 1 wherein said adapter is formed of stainless steel.

* * * * *